(No Model.)

S. D. BORTELL.
DOUBLETREE.

No. 374,139. Patented Nov. 29, 1887.

WITNESSES:
Th. Rolle.
Jas. F. Kelly.

INVENTOR
Samuel D. Bortell.
BY Diedersheim & Fintner
ATTORNEYS.

UNITED STATES PATENT OFFICE.

SAMUEL D. BORTELL, OF PHILADELPHIA, ASSIGNOR OF ONE-HALF TO WILSON B. SOLLIDAY, OF SOUTH EASTON, PENNSYLVANIA.

DOUBLETREE.

SPECIFICATION forming part of Letters Patent No. 374,139, dated November 29, 1887.

Application filed August 4, 1887. Serial No. 246,120. (No model.)

*To all whom it may concern:*

Be it known that I, SAMUEL D. BORTELL, a citizen of the United States, residing in the city and county of Philadelphia, State of Pennsylvania, have invented a new and useful Improvement in Doubletrees, which improvement is fully set forth in the following specification and accompanying drawings.

My invention relates to improvements in doubletrees designed for use either with two or three horses, as desired; and it consists of improved forms of single and double trees, so that the change can be speedily made from one form to the other, as desired.

Figure 1:
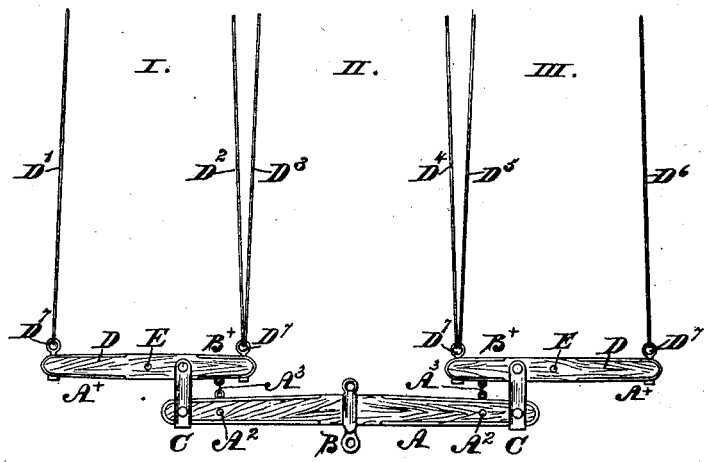
Figure 2:
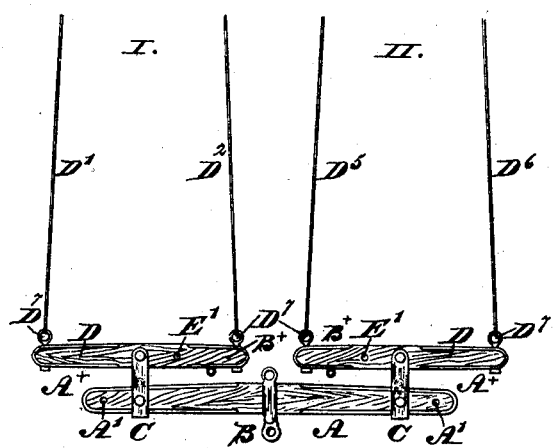

Referring to the drawings, Figures 1 and 2 represent plan views of my improved doubletree when arranged for use with two and three horses, respectively.

Similar letters of reference indicate corresponding parts in the two figures.

A represents the doubletree, having the usual clevis, B, and links C C for connecting the singletrees D D therewith, the doubletree having two openings, $A'$ $A^2$. The inner ends of the singletrees near each end are connected with outer ends of the doubletrees by chain-links or straps $A^3$, which are employed when three horses are used, in order to limit the motions of the singletrees at their inner ends, and thus prevent unequal strain on the parts.

$D'$ $D^2$ $D^3$ $D^4$ $D^5$ $D^6$ are the tugs, and $D^7$ the hooks or eyes therefor.

E $E'$ are clevis holes or points for attaching the singletrees to the doubletrees, according as is desired to use the apparatus with two or three horses.

It will be observed that the holes E are in the middle of the singletrees, while holes $E'$ $E'$ are at points one-third the length of the singletree from the inner ends thereof, so as to distribute the power between three horses, as will be hereinafter described.

Having thus described the several parts of my invention, I will now explain its mode of operation.

When arranged, as in Fig. 2, for two horses, the operation is as usual in all old forms of doubletrees and need not be described here. When arranged as in Fig. 1, however, the pull is distributed between three horses. For illustration, suppose each horse to pull five hundred pounds and the lever-arms $A^\times$ and $B^\times$ of the singletrees to be for $A^\times$ each two feet and for $B^\times$ each one foot. Then horse one will exert on tug $D'$ two hundred and fifty pounds into the arm $A^\times$, equals two hundred and fifty multiplied by two equals five hundred pounds, and on tug $D^2$ two hundred and fifty pounds into the arm $B^\times$ equals two hundred and fifty multiplied by one equals two hundred and fifty pounds. Horse two will exert two hundred and fifty pounds on each tug $D^3$ and $D^4$ into the arms $B^\times$, equals two hundred and fifty multiplied by one pound, which, added to two hundred and fifty pounds exerted by horse one, makes five hundred pounds on arm $B^\times$, thus balancing the power on arm $A^\times$. So the power from horse two on tug $D^4$, with that from horse three on tug $D^5$, balances the power on arm $A^\times$ of the other singletree, and the power is transmitted to the equal-arms of the doubletree A, and ultimately to the clevis and load to be pulled.

I am aware that doubletrees arranged for use with either two or three horses are common, and such I do not broadly claim; but the particular construction herein shown and described, wherein the singletrees used in connection with the doubletrees have a double connection with the said doubletrees, is believed to be new.

Having thus described my invention, what I claim as new, and desire to secure by Letters Patent, is—

1. The doubletree A, with clevis B, and having the openings $A'$ $A^2$ at each end thereof, in combination with the singletrees D D, each having the openings E $E'$, and the links C C and chain-links $A^3$, connecting each of said singletrees to said doubletrees.

2. A doubletree, in combination with a singletree and a connecting-link, and chains or links $A^3$, secured to said single and double tree, substantially as and for the purpose set forth.

3. A doubletree and singletrees, each having two points of attachments for the clevises which connect them and straps or eqivalents at the inner ends of the singletrees and outer ends of the doubletrees for limiting the outward motions of the singletrees at said inner ends, substantially as described.

S. D. BORTELL.

Witnesses:
JAMES F. O'KELLY,
JOHN A. WIEDERSHEIM.